US012761663B2

(12) United States Patent
Zhan et al.

(10) Patent No.: US 12,761,663 B2
(45) Date of Patent: Oct. 13, 2026

(54) UNMANNED AERIAL VEHICLE CONTROL METHOD AND CONTROL APPARATUS, UNMANNED AERIAL VEHICLE, AND STORAGE MEDIUM

(71) Applicant: SZ DJI TECHNOLOGY CO., LTD., Shenzhen (CN)

(72) Inventors: Zhiguo Zhan, Shenzhen (CN); Xinyu Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 39 days.

(21) Appl. No.: 18/679,257

(22) Filed: May 30, 2024

(65) Prior Publication Data

US 2024/0319741 A1 Sep. 26, 2024

Related U.S. Application Data

(63) Continuation of application No. PCT/CN2021/134859, filed on Dec. 1, 2021.

(51) Int. Cl.
*G05D 1/617* (2024.01)
*B64U 20/50* (2023.01)
(Continued)

(52) U.S. Cl.
CPC ............. *G05D 1/617* (2024.01); *B64U 20/50* (2023.01); *B64U 20/87* (2023.01); *G05D 1/652* (2024.01); *G06V 10/16* (2022.01); *G06V 10/761* (2022.01); *G06V 10/764* (2022.01); *G06V 10/774* (2022.01); *G06V 10/82* (2022.01);
(Continued)

(58) Field of Classification Search
CPC .. G05D 1/617; G05D 1/652; G05D 2109/254; G05D 2111/10; G05D 1/2247; G05D 1/80; B64U 20/50; B64U 20/87; B64U 2201/20; B64U 10/13; B64U 10/14; B64U 2101/30; B64U 50/19; G06V 10/16;
(Continued)

(56) References Cited

U.S. PATENT DOCUMENTS 12,277,850 B1 * 4/2025 Boyle .............. G08B 13/19613
2019/0206266 A1 7/2019 Taveira et al.
(Continued)

FOREIGN PATENT DOCUMENTS

CN 106054737 A * 10/2016 ............... G05D 1/12
CN 108279702 A 7/2018
(Continued)

OTHER PUBLICATIONS

DJI, DJI Mini 2 360° Propeller Guard User Guide, DJI, 2020 (Year: 2020).*
(Continued)

*Primary Examiner* — Hitesh Patel
*Assistant Examiner* — Shien Ming Chou

(57) ABSTRACT

A method for controlling a UAV includes: receiving a takeoff control command, where the takeoff control command is used to control the UAV to take off; in response to the takeoff control command, when the UAV is not equipped with the safety protection device, prohibiting the UAV from taking off, and/or when the UAV is equipped with the safety protection device, controlling the UAV to take off. This method enhances the safety and usability of the UAV.

20 Claims, 3 Drawing Sheets

(51) Int. Cl.

| | |
|---|---|
| ***B64U 20/87*** | (2023.01) |
| ***G05D 1/652*** | (2024.01) |
| ***G05D 109/25*** | (2024.01) |
| ***G05D 111/10*** | (2024.01) |
| ***G06V 10/10*** | (2022.01) |
| ***G06V 10/74*** | (2022.01) |
| ***G06V 10/764*** | (2022.01) |
| ***G06V 10/774*** | (2022.01) |
| ***G06V 10/82*** | (2022.01) |

(52) U.S. Cl.
CPC ... *B64U 2201/20* (2023.01); *G05D 2109/254* (2024.01); *G05D 2111/10* (2024.01)

(58) Field of Classification Search
CPC .. G06V 10/761; G06V 10/764; G06V 10/774; G06V 10/82; G06V 20/17; B64C 39/02
USPC .............................................................. 701/2
See application file for complete search history.

(56) References Cited

U.S. PATENT DOCUMENTS

| | | | | |
|---|---|---|---|---|
| 2019/0206267 | A1* | 7/2019 | Taveira | ................. B64C 27/006 |
| 2019/0315458 | A1 | 10/2019 | Gazzino et al. | |
| 2021/0216085 | A1 | 7/2021 | Wake et al. | |

FOREIGN PATENT DOCUMENTS

| | | | | | |
|---|---|---|---|---|---|
| CN | 109606730 | A | | 4/2019 | |
| CN | 110291012 | A | | 9/2019 | |
| CN | 111542794 | A | | 8/2020 | |
| CN | 111542867 | A | | 8/2020 | |
| CN | 111566009 | A | | 8/2020 | |
| CN | 112698301 | A | * | 4/2021 | ............. G01S 7/495 |
| IN | 202047022786 | A | | 7/2020 | |
| WO | WO-2021012987 | A1 | * | 1/2021 | ........... G01S 15/931 |
| WO | WO-2021179293 | A1 | * | 9/2021 | ............... G05D 1/10 |

OTHER PUBLICATIONS

Brownlee, 8 Tactics to Combat Imbalanced Classes in Your Machine Learning Dataset—MachineLearning Mastery.com, 2020 (Year : 2020).*
FAA Preflight, faa.gov, 2020 (Year: 2020).*
AOPA Before Takeoff Checklist, aopa.org, 2019 (Year: 2019).*
Viso Evaluate ML Models with Confusion Matrix & Metrics, Viso AI, 2021 (Year: 2021).*
International Search Report of PCT/CN2021/134859 (Aug. 25, 2022).
Yan, Yousan. "Face Image Processing by Deep Learning : Core Algorithms and Practices". China Machine Press, Jul. 31, 2020, pp. 107-109, ISBN: 978-7-111-66025-5.

* cited by examiner

UNMANNED AERIAL VEHICLE CONTROL METHOD AND CONTROL APPARATUS, UNMANNED AERIAL VEHICLE, AND STORAGE MEDIUM

RELATED APPLICATIONS

This application is a continuation application of PCT application No. PCT/CN2021/134859, filed on Dec. 1, 2021, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of unmanned aerial vehicles, and in particular, to a control method and a control device for an unmanned aerial vehicle (UAV), a UAV, and a storage medium.

BACKGROUND

UAVs are widely welcomed by consumers for their foldable design, portability, and ease of maintenance. However, UAVs are also considered hazardous items, and improper use can easily result in personal injury or property damage. To address this, regulations specific to UAVs have been issued in various regions. For example, UAVs are required to be equipped with safety devices such as propeller guards and navigation lights. However, mandating the fixed installation of propeller guards and navigation lights before leaving the factory poses challenges to the folding design of UAVs and makes it inconvenient for later replacement and maintenance. Failure to install such safety devices may render UAVs unsellable or unusable.

SUMMARY

In view of the foregoing, embodiments of the present disclosure provide a UAV control method and control device, a UAV, and a storage medium, which are aimed at enhancing the safety and convenience of UAVs.

In a first aspect, embodiments of the present disclosure provide an aircraft, including: a body, including one or more propellers; at least one storage medium storing at least one set of instructions for controlling the aircraft; and at least one processor in communication with the at least one storage medium, where during operation, the at least one processor executes the at least one set of instructions to cause the device to at least: receive a takeoff control instruction, and execute the takeoff control instruction based on whether a safety protection device is installed around the one or more propellers to control the aircraft to take off, or not execute the takeoff control instruction to not allow the aircraft to take off, where executing the takeoff control instruction corresponds to that the safety protection device is installed around the one or more propellers, and not executing the takeoff control instruction corresponds to that the safety protection device is not installed around the one or more propellers.

In a second aspect, embodiments of the present disclosure provide an aircraft, including: a body, including one or more propellers; at least one storage medium storing at least one set of instructions for controlling the aircraft; and at least one processor in communication with the at least one storage medium, where during operation, the at least one processor executes the at least one set of instructions to cause the device to at least: receive a takeoff control instruction, execute the takeoff control instruction based on whether a safety protection device is installed around the one or more propellers to control the aircraft to take off, or not execute the takeoff control instruction to not allow the aircraft to take off, where executing the takeoff control instruction corresponds to that the safety protection device is installed around the one or more propellers, and not executing the takeoff control instruction corresponds to that the safety protection device is not installed around the one or more propellers, and not executing the takeoff control instruction to not allow the aircraft to take off includes not executing the takeoff control instruction and not determining surrounding conditions.

In a third aspect, embodiments of the present disclosure provide a method for control an aircraft, including: receiving a takeoff control instruction; and executing the takeoff control instruction based on whether a safety protection device is installed around the one or more propellers to control the aircraft to take off, or not execute the takeoff control instruction to not allow the aircraft to take off, where the executing of the takeoff control instruction corresponds to that the safety protection device is installed around the one or more propellers, and the not executing the takeoff control instruction corresponds to that the safety protection device is not installed around the one or more propellers.

Embodiments of the present disclosure provide a UAV control method and control device, a UAV, and a storage medium. The control method involves receiving a takeoff control command and responding to the command. If the UAV is not equipped with a safety protection device, takeoff is prohibited. However, if the UAV is equipped with the safety protection device, it is allowed to take off. This eliminates the need for mandatory installation of safety devices such as propeller guards and navigation lights before the UAV leaves the factory, making it easier for later replacement and maintenance. This approach also enhances the safety and usability of UAVs.

It should be understood that the general description above and the detailed description that follows are merely exemplary and explanatory and should not be construed to limit the present disclosure.

BRIEF DESCRIPTION OF THE DRAWINGS

In order to clearly illustrate the technical solutions of the embodiments of the present disclosure, the following will briefly introduce the drawings for the description of some exemplary embodiments. Apparently, the accompanying drawings in the following description are some exemplary embodiments of the present disclosure. For a person of ordinary skill in the art, other drawings may also be obtained based on these drawings without creative efforts.

DETAILED DESCRIPTION

The following in conjunction with the accompanying drawings of the embodiments of the present disclosure provides a description of the technical solutions of the present disclosure. Apparently, the described exemplary embodiments are only part of the embodiments of the present disclosure. Based on the embodiments of the present disclosure, all other embodiments obtained by a person skilled in the art without exercising inventive labor fall within the scope of protection of the present disclosure.

The flowchart shown in the accompanying drawings is for illustrative purposes only and does not necessarily include all content and operations/steps, nor is it mandatory to execute them in the order described. For example, some operations/steps can be separated, combined, or partially merged, so the actual execution order may change depending on the circumstances.

UAVs are widely welcomed by consumers for their foldable design, portability, and ease of maintenance. However, UAVs are also considered hazardous items, and improper use can easily result in personal injury or property damage. To address this, regulations specific to UAVs have been issued in various regions. For example, UAVs are required to be equipped with safety devices such as propeller guards and navigation lights. However, mandating the fixed installation of propeller guards and navigation lights before leaving the factory poses challenges to the folding design of UAVs and makes it inconvenient for later replacement and maintenance. Failure to install such safety devices may render UAVs unsellable or unusable (it is noted that UAV is merely an example for the present disclosure, the present disclosure covers any suitable aircraft including UAV and other types of aircrafts).

To solve the above problems, Embodiments of the present disclosure provide a UAV control method and control device, a UAV, and a storage medium. The control method involves receiving a takeoff control command and responding to the command. If the UAV is not equipped with a safety protection device, takeoff is prohibited. However, if the UAV is equipped with the safety protection device, it is allowed to take off. This eliminates the need for mandatory installation of safety devices such as propeller guards and navigation lights before the UAV leaves the factory, making it easier for later replacement and maintenance. This approach also enhances the safety and usability of UAVs.

Below, in conjunction with the accompanying drawings, detailed explanations are provided for some exemplary embodiments of the present disclosure. Unless conflicting, the following exemplary embodiments and the features thereof can be combined with each other.

Figure 1:
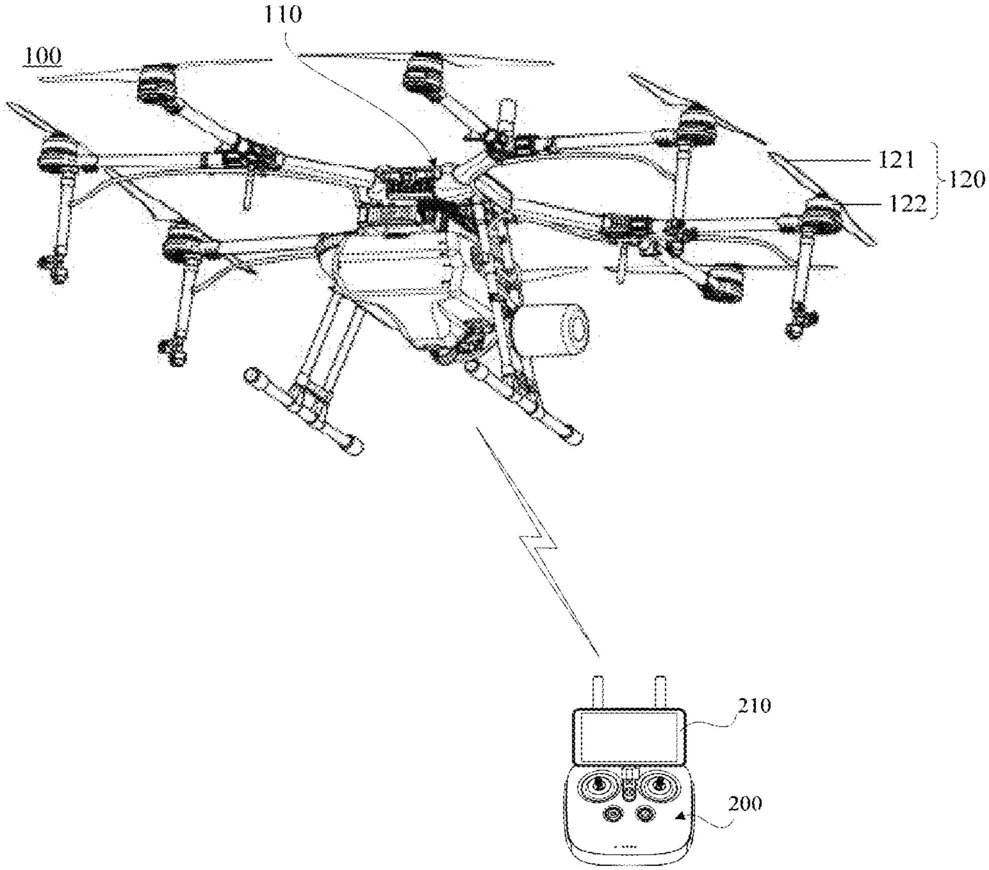
FIG. 1 is a schematic diagram of a scenario illustrating a control method of a UAV according to some embodiments of the present disclosure.

With reference to FIG. 1, FIG. 1 is a schematic diagram of a scenario illustrating a control method of a UAV according to some embodiments of the present disclosure.

As shown in FIG. 1, the scenario includes a UAV 100 and a control terminal 200. The control terminal 200 is in communication with the UAV 100 and is used to control it. The UAV 100 includes a body 110, a propulsion system 120 (not shown in FIG. 1), a connection part (not shown in FIG. 1), and a control system (not shown in FIG. 1). The propulsion system 120 is located on the body 110 and provides flight power for the UAV 100. The connection part is located on the body 110 and is used to detachably connect a safety protection device(s). The safety protection device(s) may include one or more of the following: propeller guards, navigation lights for night flights, and collision avoidance markings.

In some exemplary embodiments, the connection part includes a first attracting member, and the safety protection device includes a second attracting member. The second attracting member can attract the first attracting member by magnetic force, so that when installing the safety protection device, the first attracting member and the second attracting member are oppositely attracted and adhered together, thus detachably mounting the safety protection device on the UAV 100. It can be understood that the magnetic attraction connection can utilize the attraction between a magnet and a metal that can be attracted by the magnet, or the attraction between two magnets with different poles. Typically, a magnet has two magnetic poles, one being the north pole (N) and the other being the south pole (S), while the metal is generally made of soft magnetic materials.

The first attracting member can include a single-sided single-pole magnetic member(s), a single-sided double-pole magnetic member(s), or other magnetizable members. It should be noted that other magnetizable members can be attracted by a magnetic member. For example, other magnetizable components may include iron, nickel, cobalt, etc. Specifically, a single-sided single-pole magnetic member includes two opposite end faces, each end face having a unique magnetic pole, with one end face being the north pole (N) and the other end face being the south pole (S). The magnetic flux lines of the single-sided single-pole magnetic member originate from the north pole and pass through to the south pole. The magnetic circuit of the single-sided single-pole magnetic member is relatively open, resulting in a larger range of attraction for other magnet/attracting members. The shape of the single-sided single-pole magnetic member includes but is not limited to circular, elliptical, and rectangular shapes.

In some exemplary embodiments, the second attracting member includes a single-sided single-pole magnetic member(s), a single-sided double-pole magnetic member(s), the quantity of the single-sided single-pole magnetic member and the single-sided double-pole magnetic member in the second attracting member is the same as the quantity of those in the first attracting member. The polarity of the magnetic members in the second attracting member is the opposite polarity of the corresponding magnetic members in the first attracting member.

In some exemplary embodiments, the propulsion system 120 may include one or more propellers 121, one or more motors 122 corresponding to the one or more propellers, and one or more electronic speed controllers (referred to as ESCs). The motor 122 is connected between the electronic speed controller and the propeller 121, and the motor 122 and the propeller 121 are mounted on the body 110 of the UAV 100. The electronic speed controller is used to receive a drive signal generated by a control device and provide a drive current to the motor 122 according to the drive signal so as to control the speed of the motor 122.

The motor 122 is used to drive the propeller 121 to rotate, thereby providing power for the movement of the UAV 100, enabling the UAV 100 to achieve one or more degrees of freedom in motion. In some exemplary embodiments, the UAV 100 can rotate around one or more axes. For example, the aforementioned rotation axes may include roll axis, yaw axis, and pitch axis. It should be understood that the motor 122 can be a DC motor or an AC motor. Additionally, the motor 122 can be a brushless motor or a brushed motor.

In some exemplary embodiments, the control system can include a control device and a sensor system. The sensor system can be used to measure the attitude and motion information of the UAV, such as three-dimensional position, three-dimensional angle, three-dimensional velocity, three-dimensional acceleration, and three-dimensional angular velocity. The attitude information refers to the spatial position and attitude information of the UAV 100. The sensor system may include at least one sensor such as a gyroscope, an ultrasonic sensor, an electronic compass, an Inertial Measurement Unit (IMU), a vision sensor, a Global Navigation Satellite System (GNSS), and barometer. For example, the Global Navigation Satellite System can be the Global Positioning System (GPS). The control device is used to control the motion of the UAV 100. For instance, it can control the motion of the UAV 100 based on the measured position and/or attitude information from the sensor system. It should be understood that the control device can automatically control the UAV 100 according to pre-programmed instructions.

In some exemplary embodiments, the control terminal 200 receives a takeoff control command triggered by a user and sends this takeoff control command to the UAV 100. The UAV 100 receives the takeoff control command sent by the control terminal 200. The control device of the UAV 100 obtains this takeoff control command and responds to it. If the UAV 100 is not equipped/installed with a safety protection device, the UAV is prohibited from taking off. However, if the UAV 100 is equipped/installed with a safety protection device, it controls the UAV to take off.

In some exemplary embodiments, the UAV can also include at least one of the following devices: a spraying device, a spreading device, an imaging device, and a detection device. For example, the imaging device can be coupled to be carried on a gimbal of the UAV 100, or it can be integrally installed on a platform body 110 of the UAV 100. The imaging device can specifically include a camera, namely a monocular imaging scheme; or it can include two cameras, namely a binocular imaging scheme. Of course, the number of imaging devices can also be one or more. When there are multiple imaging devices, they can be distributed at multiple positions on the platform body 110. The multiple imaging devices can work independently or in coordination. The detection device can be coupled to be carried on the gimbal of the UAV 100, or it can be integrally installed on the platform body 110 of the UAV 100. The detection device can be a lidar or a millimeter-wave radar.

In some exemplary embodiments, the control terminal 200 is in communication with a display device 210, which is used to display images or a human-machine interface of the control terminal 200. Users can control the UAV 100 or view the status information of the UAV 100 with this human-machine interface. It should be noted that the display device 210 can include a display screen set on the control terminal 200 or a monitor independent of the control terminal 200. The monitor independent of the control terminal 200 can include devices such as smartphones, tablets, or personal computers, or it can also be other electronic devices with a display screen. The display screen includes LED display screens, OLED display screens, LCD display screens, and so on. The control terminal 200 can also be other electronic devices with a display screen, such as remote controls, smartphones, tablets, or laptops, among others.

The control method for a UAV provided in some exemplary embodiments of the present application will be detailed below in conjunction with the scenario depicted in FIG. 1. It should be noted that the scenario in FIG. 1 is only used to explain the control method of a UAV provided in some exemplary embodiments of the present disclosure, but does not constitute a limitation on the application scenarios of the control method for a UAV provided in the embodiments of the present disclosure.

Figure 2:
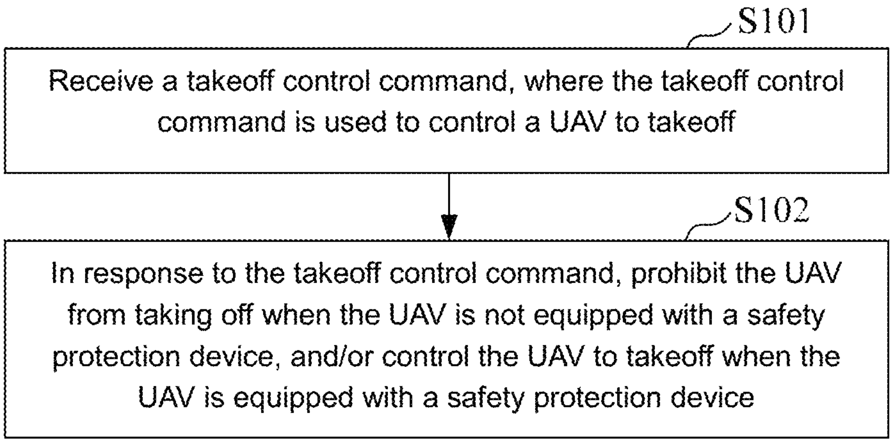
FIG. 2 is a schematic flow chart illustrating the steps of a UAV control method according to some embodiments of the present disclosure.

With reference to FIG. 2, FIG. 2 is a schematic flow chart illustrating the steps of a UAV control method according to some embodiments of the present disclosure. The control method for a UAV can be applied to various types of UAVs, such as dual-rotor UAVs, quadcopter UAVs, hexacopter UAVs, octocopter UAVs, etc. Of course, it can also be a fixed-wing UAV or a combination of rotor-wing and fixed-wing UAVs, without limitation to these specific types.

The control method for a UAV, as shown in FIG. 2, includes steps S101 to S102.

Step S101 includes: receiving a takeoff control command, where the takeoff control command is used to control a UAV to takeoff.

Step S102 includes: in response to the takeoff control command, prohibiting the UAV from taking off when the UAV is not equipped with a safety protection device, and/or controlling the UAV to takeoff when the UAV is equipped with a safety protection device.

In the above solution, the prohibiting of the UAV from taking off when the UAV is not equipped with a safety protection device, and/or the controlling of the UAV to takeoff when the UAV is equipped with a safety protection device includes:

Scheme I: prohibiting the UAV from taking off when the UAV is not equipped with a safety protection device;

Scheme II: controlling the UAV to takeoff when the UAV is equipped with a safety protection device;

Scheme III: prohibiting the UAV from taking off when the UAV is not equipped with a safety protection device; controlling the UAV to takeoff when the UAV is equipped with a safety protection device.

Exemplarily, obtain the takeoff control command sent from the control terminal communicating with the UAV. The control terminal includes a takeoff control button. When a user triggers the takeoff control button, a takeoff control command is generated and sent to the UAV. The takeoff control button can be a physical button or a virtual button displayed on the interface. In addition to button-triggered commands, the takeoff control command can also be triggered by physical controls such as dials, joysticks, or by voice commands, motion sensing, and other methods.

In some exemplary embodiments, if the UAV is not equipped with a safety protection device, then UAV takeoff is prohibited, and a takeoff failure prompt message is outputted to notify the user that the UAV is prohibited from taking off due to the absence of a safety protection device. The output method for the takeoff failure prompt message include one or more of the following: controlling the UAV to broadcast a prompt sound, controlling the UAV's flashing lights to blink at a preset frequency or color, commanding the UAV to hover in place, directing the UAV to maintain a preset attitude or direction, or instructing the UAV to send a takeoff failure prompt message to the control terminal for displaying or broadcasting to indicate the takeoff failure message.

In some exemplary embodiments, in response to the takeoff control command, retrieve the installation detection information outputted by an installation detection device used to detect the installation of the safety protection device. When the installation detection information meets a preset condition, confirm that the UAV is equipped with a safety protection device. When the installation detection information does not meet the preset condition, confirm that the UAV is not equipped with a safety protection device. The installation detection device includes at least one of the following: a magnetic induction sensor, a near-field communication device, an infrared induction device, a touch switch, etc. The installation detection information includes at least one of the following: magnetic field strength collected by the magnetic induction sensor, near-field communication information collected by the near-field communication device, level signal outputted by the infrared induction device, operating status of the touch switch. Based on the installation detection information outputted by the installation detection device, the presence or absence of the safety protection device on the UAV can be accurately determined.

In some exemplary embodiments, the preset condition includes at least one of the following: the magnetic field strength collected by the magnetic induction sensor is greater than or equal to a preset magnetic field strength, the near-field communication information collected by the near-field communication device contains an identity code of the safety protection device, and the identity code matches the device ID of the near-field communication device, the level signal outputted by the infrared induction device is a preset level signal, and the operating status of the touch switch is in an open/started state. The preset magnetic field strength and preset level signal can be set based on actual circumstances, and the present disclosure does not specify the specific values thereof.

Exemplarily, when the UAV is equipped with a safety protection device, the magnetic induction sensor can collect the magnetic field strength of a magnetic member on the safety protection device, and this magnetic field strength is greater than or equal to the preset magnetic field strength. However, when the UAV is not equipped with a safety protection device, the magnetic induction sensor is unable to collect the magnetic field strength of the magnetic member on the safety protection device. In this case, the magnetic induction sensor collects a magnetic field strength that is less than the preset magnetic field strength.

Exemplarily, the safety protection device is equipped with an NFC tag, and the NFC tag stores the identity code of the safety protection device. When the UAV is equipped with the safety protection device, the near-field communication device of the UAV can read the identity code stored in the NFC tag carried by the safety protection device. However, when the UAV is not equipped with the safety protection device, the near-field communication device of the UAV cannot read the identity code stored in the NFC tag carried by the safety protection device.

Figure 3:
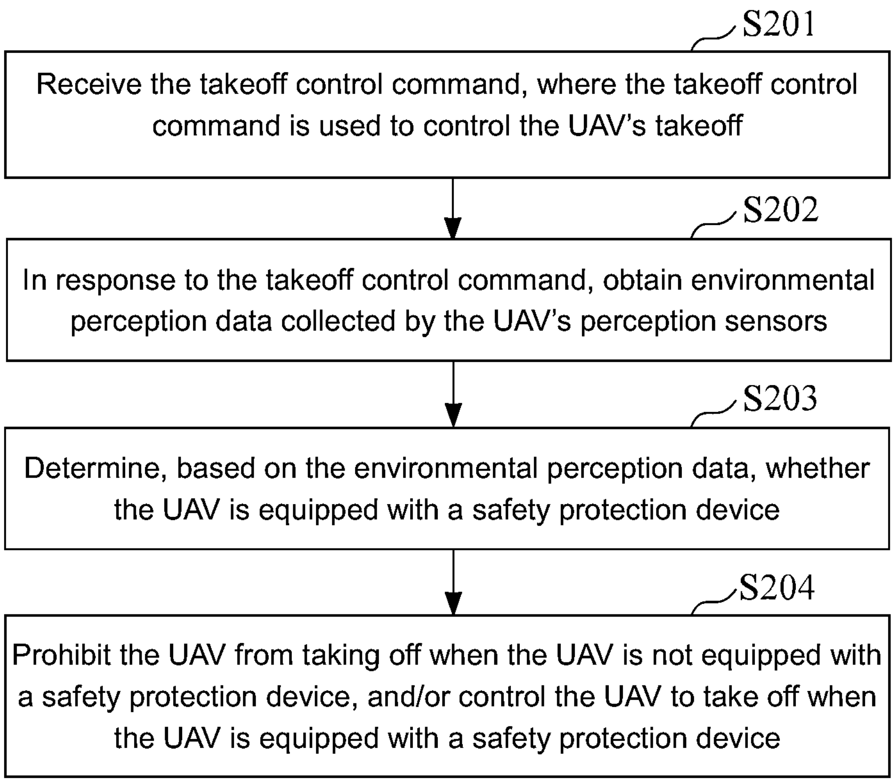
FIG. 3 is a schematic flow chart illustrating the steps of a UAV control method according to some embodiments of the present disclosure.

In some exemplary embodiments, as shown in FIG. 3, the control method of the UAV includes steps S201 to S204.

Step S201: Receive the takeoff control command, where the takeoff control command is used to control the UAV's takeoff.

Step S202: In response to the takeoff control command, obtain environmental sensing data collected by the UAV's perception sensors.

Step S203: Determine, based on the environmental sensing data, whether the UAV is equipped with a safety protection device.

Step S204: Prohibit the UAV from taking off when the UAV is not equipped with a safety protection device, and/or control the UAV to take off when the UAV is equipped with a safety protection device.

In some exemplary embodiments, the UAV's perception sensors can include imaging devices and/or radar devices. The environmental sensing data includes image data collected by imaging devices and/or point cloud data collected by radar devices. With the imaging devices and/or radar devices, it is possible to accurately determine whether the UAV is equipped with a safety protection device, without the need to add additional equipment to detect whether the UAV is equipped with a safety protection device.

Figure 4:
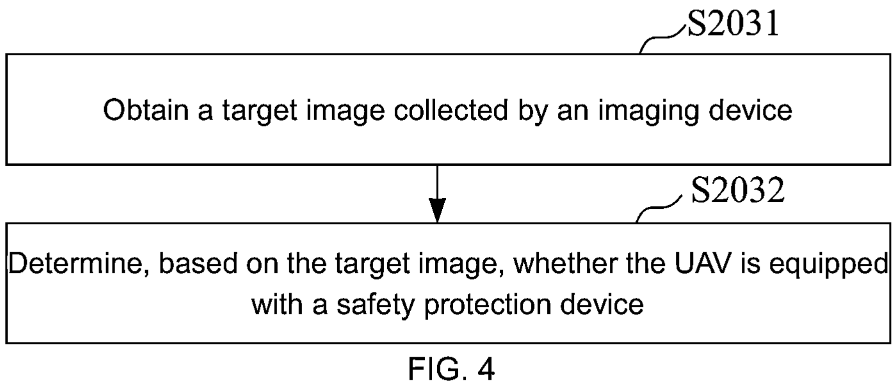
FIG. 4 is a schematic flow chart of sub-steps of the UAV control method illustrated in FIG. 3 according to some embodiments of the present disclosure.

In some exemplary embodiments, as shown in FIG. 4, step 203 can include sub-steps S2031 to S2032.

S2031: Obtain a target image collected by an imaging device.

S2032: Determine, based on the target image, whether the UAV is equipped with a safety protection device.

Exemplarily, based on the target image, it is determined whether the installation occupancy area on the UAV is equipped with a safety protection device. If the installation occupancy area on the UAV is equipped with a safety protection device, it indicates that the UAV is equipped with a safety protection device. If the installation occupancy area on the UAV is not equipped with a safety protection device, it indicates that the UAV is either not correctly installed or does not have a safety protection device installed. The installation occupancy area refers to an area required for installing the safety protection device on the UAV, such as the position for installing the propeller guard(s).

Exemplarily, the target image includes at least part of the installation occupancy area of the safety protection device on the UAV.

Exemplarily, obtain a reference comparison image, which is the image collected by the imaging device when the UAV is equipped with a safety protection device. The reference comparison image includes at least part of the installation occupancy area. Determine the similarity between the reference comparison image and the target image. When the similarity is greater than or equal to a preset similarity threshold, determine that the UAV is equipped with a safety protection device. When the similarity is less than the preset similarity threshold, determine that the UAV is not equipped with a safety protection device. The preset similarity threshold can be set based on actual conditions, without specific limitations herein. By comparing the target image collected by the imaging device with the reference comparison image when receiving the takeoff control command, it is possible to accurately determine whether the UAV is equipped with a safety protection device.

Exemplarily, obtain a reference comparison image library; determine the similarity between the target image and each reference comparison image in the library; when there is at least one reference comparison image in the library with a similarity to the target image greater than or equal to a preset similarity, determine that the UAV is equipped with the safety protection device; when there is no reference comparison image in the library with a similarity to the target image greater than or equal to the preset similarity, determine that the UAV is not equipped with the safety protection device. The reference comparison image library includes a plurality of different reference comparison images, and the safety protection device in different reference comparison images is the same, while the backgrounds are different. By comparing the target image captured by the imaging device with different reference comparison images in the reference comparison image library upon receiving the takeoff control command, it is possible to accurately determine whether the UAV is equipped with the safety protection device.

Exemplarily, obtain a first recognition model of the safety protection device; based on the first recognition model and the target image, determine whether the UAV is equipped with the safety protection device. The first recognition model is iteratively trained on a neural network model based on a first sample dataset, which includes a plurality of positive sample data and a plurality of negative sample data. The positive sample data includes first sample images and first classification labels, where the first sample images contain the safety protection device, and the negative sample data includes second sample images and second classification labels, where the second sample images do not contain the safety protection device. With the pre-trained first recognition model and the target image, it is possible to accurately determine whether the UAV is equipped with the safety protection device.

Exemplarily, input the target image into the first recognition model for recognition processing to obtain the target image's classification label. When the classification label is the first classification label, determine that the UAV is equipped with the safety protection device; when the classification label is the second classification label, determine that the UAV is not equipped with the safety protection device. The first and second classification labels are different.

In some exemplary embodiments, obtain an ambient light intensity; when the ambient light intensity is greater than or equal to a preset light intensity threshold, obtain the target image captured by the image acquisition device; based on the target image, determine whether the UAV is equipped with the safety protection device. The ambient light intensity can be obtained with a photosensitive sensor in the UAV, and the light intensity threshold can be set based on actual conditions, without specific limitations made herein. In cases with good ambient light, the target images captured by the imaging device are more accurate, thus enabling precise determination of whether the UAV is equipped with the safety protection device based on accurate target images, thereby improving judgment accuracy.

Exemplarily, obtain the image captured by the imaging device when it is in a preset attitude, and designate the image as the target image. The imaging device is positioned with the present attitude such that its capture range partially or fully overlaps with/covers the installation occupancy area of the safety protection device on the UAV. The imaging device may be mounted on a gimbal, through which the attitude of the imaging device can be adjusted. By controlling the imaging device to be in the preset attitude, the captured image can partially or fully include the installation occupancy area of the safety protection device on the UAV, thereby facilitating the subsequent accurate determination of whether the UAV is equipped with the safety protection device.

Exemplarily, obtain a plurality of images captured by the imaging device while it rotates within a first rotation range, and combine the plurality of images together to obtain the target image. During the imaging device's rotation within the first rotation range, its imaging range partially or fully overlaps with/covers the installation occupancy area of the safety protection device on the UAV. The imaging device may be mounted on a gimbal, through which the imaging device can be controlled to rotate within the first rotation range. The controlling of the imaging device's rotation within the first rotation range includes controlling the imaging device to rotate in pitch, yaw, and/or translation directions. By controlling the imaging device's rotation within the first rotation range, the captured images can partially or fully include the installation occupancy area of the safety protection device on the UAV, thereby facilitating the subsequent accurate determination of whether the UAV is equipped with the safety protection device.

In some exemplary embodiments, after controlling the UAV to take off, control the imaging device to rotate within a second rotation range. When the imaging device rotates within the second rotation range, its imaging range does not overlap with/cover the installation occupancy area of the safety protection device on the UAV. After the UAV takes off, limit the rotation range of the imaging device to the second rotation range. This ensures that the images captured by the imaging device do not include the safety protection device, thereby preserving the imaging device's image capture effectiveness and enhancing user experience.

In some exemplary embodiments, obtain the point cloud data collected by a radar device and obtain the position coordinates corresponding to the installation location of the safety protection device on the UAV. From the point cloud data, extract target point cloud data matching the position coordinates and obtain a second recognition model of the safety protection device. Based on the target point cloud data and the second recognition model, determine whether the UAV is equipped with the safety protection device. With the radar device, it is possible to determine whether the UAV is equipped with the safety protection device regardless of environmental light intensity, ensuring the accuracy of the judgment.

Exemplarily, input the target point cloud data into the second recognition model for recognition processing to obtain the classification label of the target point cloud data. When the classification label of the target point cloud data is the preset classification label, determine that the UAV is equipped with the safety protection device; when the classification label of the target point cloud data is not the preset classification label, determine that the UAV is not equipped with the safety protection device. The second recognition model is iteratively trained on a neural network model based on the second sample dataset, which includes a plurality of sample data. This sample data includes sample point cloud data matching the position coordinates and annotated classification labels.

In some exemplary embodiments, when the ambient light intensity is greater than or equal to the preset light intensity threshold, the presence of the safety protection device on the UAV can be determined using the imaging device and/or radar device. When the ambient light intensity is less than the preset light intensity threshold, the presence of safety protection equipment on the UAV can be determined using the radar device or an installation detection device. In cases with good ambient light, the target image captured by the imaging device can be more accurate. By considering the results of both the imaging device and radar device in detecting the installation of the safety protection device, the accuracy of the detection results can be improved. In cases with low ambient light, the accuracy of images captured by the imaging device is poor. Therefore, using the radar device or installation detection device can accurately determine whether the UAV is equipped with safety protection equipment. Each of the mentioned detection devices has its applicable conditions or scenarios. In specific applications, a suitable device can be selected or switched to adaptively based on the current scene or environment to detect whether the UAV is equipped with the safety protection device.

Exemplarily, based on the target image captured by the imaging device, determine a first installation detection result of the safety protection device, and based on the point cloud data collected by the radar device, determine a second installation detection result of the safety protection device. Based on the first and second installation detection results, determine whether the UAV is equipped with the safety protection device. For example, if both the first and second installation detection results indicate that the UAV is equipped with the safety protection device, then it can be concluded that the UAV has correctly installed the safety protection device. If either the first or second installation detection result indicates that the UAV is not equipped with the safety protection device, then it can be concluded that the UAV is not equipped with the safety protection device.

The control method provided in the above example for UAV involves receiving a takeoff control command, and in response thereto, if the UAV is not equipped with the safety protection device, it prohibits the UAV from taking off. If the UAV is equipped with the safety protection device, it controls the UAV to take off. This approach eliminates the need to forcibly install safety protection devices such as propeller guards and navigation lights on the UAV before leaving the factory. It facilitates future replacement and maintenance while also enhancing the safety and convenience of using the UAV.

Figure 5:
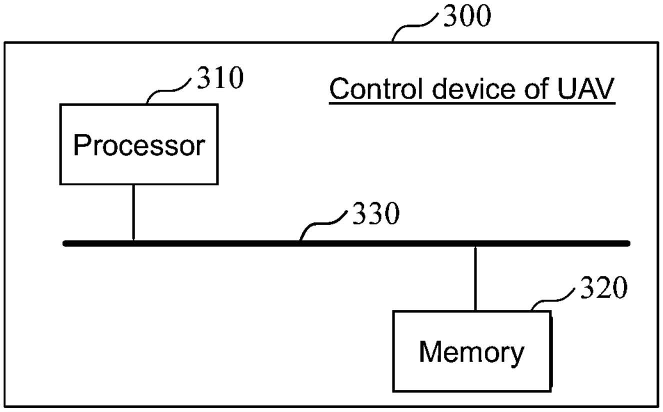
FIG. 5 is a schematic structural block diagram of a UAV control device according to some embodiments of the present disclosure.

With reference to FIG. 5, FIG. 5 is a schematic structural block diagram of a UAV control device according to some embodiments of the present disclosure.

As shown in FIG. 5, the control device 300 of the UAV includes at least one processor 310 and at least one memory/storage device 320. The processor 310 and the memory/storage device 320 are connected via a bus 330, such as an I2C (Inter-integrated Circuit) bus.

Specifically, the processor 310 can be a microcontroller unit (MCU), a central processing unit (CPU), or a digital signal processor (DSP), among others.

Specifically, the memory/storage device 320 can be a Flash chip, read-only memory (ROM) disk, CD-ROM, USB flash drive, or external hard drive, among others.

The processor 310 is used to execute a computer program stored in the memory/storage device 320 and performs the following steps while executing the computer program:

Receiving a takeoff control command, where the takeoff control command is used to control the UAV to take off;

In response to the takeoff control command, prohibiting the UAV from taking off when the UAV is not equipped with a safety protection device, and/or control the UAV to take off when the UAV is equipped with the safety protection device.

In some exemplary embodiments, the processor is also used to implement the following steps:

In response to the takeoff control command, obtaining environmental sensing data collected by a perception sensor of the UAV;

Determine, based on the environmental sensing data, whether the UAV is equipped with the safety protection device.

In some exemplary embodiments, the perception sensor includes an imaging device. The processor, when implementing the determination of whether the UAV is equipped with the safety protection device based on the environmental sensing data, is used to:

Obtain a target image captured by an imaging device, where the target image includes at least a portion of an installation occupancy area of the safety protection device on the UAV;

Determine whether the UAV is equipped with the safety protection device based on the target image.

In some exemplary embodiments, the processor, when implementing the determination of whether the UAV is equipped with the safety protection device based on the target image, is used to:

Obtain a reference comparison image, where the reference comparison image is captured by the imaging device when the UAV is equipped with the safety protection device, and the reference comparison image includes at least a portion of the installation occupancy area;

Determine a similarity between the reference comparison image and the target image;

When the similarity is greater than or equal to a preset similarity, determine that the UAV is equipped with the safety protection device;

When the similarity is less than the preset similarity, determine that the UAV is not equipped with the safety protection device.

In some exemplary embodiments, the processor, when determining whether the UAV is equipped with the safety protection device based on the target image, is used to:

Obtain a reference comparison image library, where the reference comparison image library includes a plurality of different reference comparison images;

Determine a similarity between the target image and each reference comparison image in the reference comparison image library;

When there is at least one reference comparison image in the reference comparison image library with a similarity to the target image greater than or equal to the preset similarity, determine that the UAV is equipped with the safety protection device;

When there is no reference comparison image in the reference comparison image library with a similarity to the target image greater than or equal to the preset similarity, determine that the UAV is not equipped with the safety protection device.

In some exemplary embodiments, the processor, when determining whether the UAV is equipped with the safety protection device based on the target image, is used to:

Obtain a first recognition model of the safety protection device;

Based on the first recognition model and the target image, determine whether the UAV is equipped with the safety protection device.

In some exemplary embodiments, the processor, when determining whether the UAV is equipped with the safety protection device based on the first recognition model and the target image, is used to:

Input the target image into the first recognition model for recognition processing to obtain a classification label of the target image;

When the classification label is a first classification label, determine that the UAV is equipped with the safety protection device;

When the classification label is a second classification label, determine that the UAV is not equipped with the safety protection device.

In some exemplary embodiments, the first recognition model is iteratively trained on a neural network model based on a first sample dataset, the first sample dataset includes a plurality of positive sample data and a plurality of negative sample data;

The positive sample data includes first sample images and the first classification label, where the first sample images contain the safety protection device;

The negative sample data includes second sample images and the second classification label, where the second sample images do not contain the safety protection device.

In some exemplary embodiments, before the processor implements obtaining the target image collected by the imaging device, it is also used to: Obtain an ambient light intensity;

When the ambient light intensity is greater than or equal to a preset light intensity threshold, obtain the target image collected by the imaging device.

In some exemplary embodiments, when the processor implements obtaining the target image collected by the imaging device, it is used to:

Obtain the image collected when the imaging device has a preset attitude and determine this image as the target image;

An image collection range of the imaging device having the preset attitude partially or fully overlaps with an installation occupancy area of the safety protection device on the UAV.

In some exemplary embodiments, when the processor implements obtaining the target image collected by the imaging device, it is used to:

Obtain a plurality of images collected by the imaging device when the the imaging device rotates within a first rotation range;

Combine the plurality of frames of images to obtain the target image, where when the imaging device rotates within the first rotation range, the image collection range of the imaging device partially or fully overlaps with the installation occupancy area of the safety protection device on the UAV.

In some exemplary embodiments, the processor is also used to implement the following steps:

After controlling the UAV to take off, controlling the imaging device to rotate within a second rotation range. When the imaging device rotates within the second rotation range, the image collection range of the imaging device does not overlap with the installation occupancy area of the safety protection device on the UAV.

In some exemplary embodiments, the perception sensor includes a radar device. When the processor implements determining whether the UAV is equipped with the safety protection device based on the environment perception data, it is used to:

Obtain point cloud data collected by the radar device and obtain the position coordinates corresponding to the installation location of the safety protection device on the UAV;

Obtain the target point cloud data that matches the position coordinates from the point cloud data, and obtain a second recognition model of the safety protection device;

Determine whether the UAV is equipped with the safety protection device based on the target point cloud data and the second recognition model.

In some exemplary embodiments, when the processor implements determining whether the UAV is equipped with the safety protection device based on the target point cloud data and the second recognition model, it is used to:

Input the target point cloud data into the second recognition model for recognition processing to obtain a classification label of the target point cloud data;

Determine that the UAV is equipped with the safety protection device when the classification label of the target point cloud data is a preset classification label;

Determine that the UAV is not equipped with the safety protection device when the classification label of the target point cloud data is not the preset classification label.

In some exemplary embodiments, the second recognition model is pre-trained with iterative training of a neural network model based on a second sample dataset. The second sample dataset includes a plurality of sample data, where the plurality of sample data includes sample point cloud data matched with position coordinates and annotated classification labels.

In some exemplary embodiments, the UAV also includes an installation detection device for detecting the safety protection device. The processor is further configured to implement the following steps:

In response to the takeoff control command, obtain installation detection information output by the installation detection device;

When the installation detection information meets a preset condition, determine that the UAV is equipped with the safety protection device;

When the installation detection information does not meet the preset condition, determine that the UAV is not equipped with the safety protection device.

In some exemplary embodiments, the installation detection device includes at least one of the following: magnetic induction sensor, near-field communication device, infrared sensing device, touch switch. The installation detection information includes at least one of the following: magnetic field intensity collected by the magnetic induction sensor, near-field communication information collected by the near-field communication device, level signal output by the infrared sensing device, and operating status of the touch switch.

In some exemplary embodiments, the preset condition includes at least one of the following:

The magnetic field intensity is greater than or equal to a preset magnetic field intensity;

The near-field communication information contains an identity code of the safety protection device, and the identity code matches a device ID of the near-field communication device;

The level signal output by the infrared sensing device is a preset level signal;

The operating status of the touch switch is in an open/starting state.

In some exemplary embodiments, the safety protection device includes one or more of the following: propeller guards, navigation lights, collision avoidance markings.

It should be noted that a person skilled in the art can understand that, for the sake of convenience and conciseness in description, the specific operational processes of the UAV control method described above can refer to corresponding procedures outlined in the previous embodiments of the UAV control method. Therefore, they are not reiterated herein.

Figure 6:
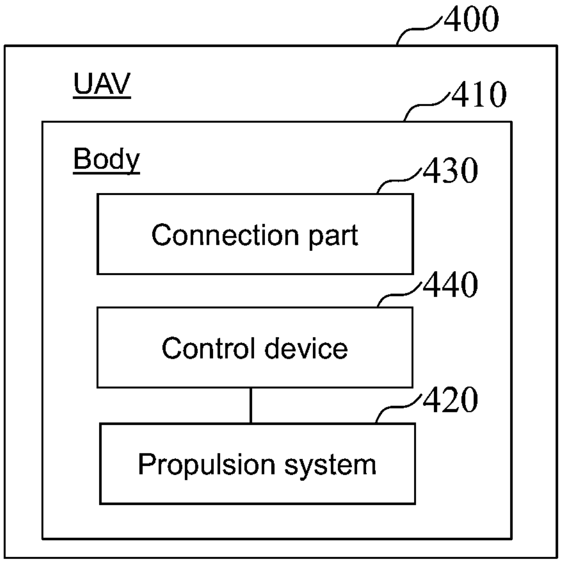
FIG. 6 is a schematic structural block diagram of a UAV according to some embodiments of the present disclosure.

With reference to FIG. 6. FIG. 6 is a schematic structural block diagram of a UAV according to some embodiments of the present disclosure.

As shown in FIG. 6, a UAV 400 includes a body 410, a propulsion system 420, a connection part 430, and a control device 440. The propulsion system 420 is mounted on the body 410 to provide flight power for the UAV 400. The connection part 430, also mounted on the body 410, is used to detachably connect a safety protection device. The control device 440 is located inside the body 410 and is responsible for controlling the UAV 400. It is worth noting that the control device 440 can be the same as the UAV control device 300 depicted in FIG. 5.

It should be noted that a person skilled in the art can understand that, for the sake of convenience and conciseness in description, the specific operational processes of the UAV described above can refer to corresponding procedures outlined in the previous embodiments of the UAV control method. Therefore, they are not reiterated herein.

Additionally, some exemplary embodiments of the present disclosure also provide a storage medium storing a computer program. The computer program includes program instructions, which, when executed by a processor, can implement the steps of the UAV control method provided in the above exemplary embodiments.

The storage medium can be the internal storage unit of the UAV as described in any of the previous exemplary embodiments, such as the UAV's hard disk or memory/storage device. The storage medium can also be an external storage device of the UAV, such as a plug-in hard disk, Smart Media Card (SMC), Secure Digital (SD) card, Flash Card, etc., equipped on the UAV.

It should be understood that the terminology used in herein is solely for the purpose of describing particular exemplary embodiments and is not intended to limit the scope of the present disclosure. As used herein and the appended claims, unless the context explicitly indicates otherwise, the singular forms "a," "an," and "the" include plural forms.

It should also be understood that, in this disclosure and the appended claims, the term "and/or" refers to any combination of one or more of the listed items, and includes all possible combinations thereof.

The foregoing description is only some specific exemplary embodiments of the present disclosure, and the scope of protection of the present disclosure is not limited thereto. Any modifications or substitutions that can be conceived by a person skilled in the art within the technical scope disclosed herein are considered to be within the scope of protection of the present disclosure. Therefore, the scope of protection of the present disclosure should be determined by the scope of protection of the appended claims.

What is claimed is:

1. An aircraft, comprising:

a body, comprising one or more propellers;

at least one storage medium storing at least one set of instructions for controlling the aircraft; and at least one processor in communication with the at least one storage medium and a sensor carried by the body, wherein during operation, the at least one processor executes the at least one set of instructions to cause the aircraft to at least:

receive a takeoff control instruction, in response to receiving the takeoff control instruction, control the sensor to turn toward a direction of the one or more propellers on the aircraft to detect installation of a safety protection device around the one or more propellers on the aircraft, and not execute the takeoff control instruction in response to the safety protection device not being installed around the one or more propellers on the aircraft; or execute the takeoff control instruction, control, after takeoff, the sensor to turn to a direction that does not face the one or more propellers on the aircraft for detection during flight, and lock the sensor in an angle range, in response to the safety protection device being installed.

2. The aircraft according to claim 1, wherein the aircraft is a foldable aircraft, and the safety protection device is not installed when the aircraft is in a folded state.

3. The aircraft according to claim 1, wherein the at least one processor executes the at least one set of instructions to further cause the aircraft to at least:

in response to the takeoff control instruction, obtain environmental sensing data collected by the sensor; and determine whether the aircraft is installed with the safety protection device based on the environmental sensing data.

4. The aircraft according to claim 3, wherein to obtain the environmental sensing data collected by the sensor, the at least one processor executes the at least one set of instructions to cause the aircraft to at least:

control a gimbal of the aircraft to drive the sensor to reach a preset attitude; and obtain the environmental sensing data by the sensor in the preset attitude.

5. The aircraft according to claim 3, wherein the sensor comprises an imaging device, and to determine whether the aircraft is installed with the safety protection device based on the environmental sensing data, the at least one processor executes the at least one set of instructions to cause the aircraft to at least:

obtain a target image collected by the imaging device, wherein the target image comprises at least a part of an installation occupancy area of the safety protection device on the aircraft; and determine whether the aircraft is installed with the safety protection device based on the target image.

6. The aircraft according to claim 5, wherein to determine whether the aircraft is installed with the safety protection device based on the target image, the at least one processor executes the at least one set of instructions to cause the aircraft to at least:

obtain a reference comparison image, wherein the reference comparison image is collected by the imaging device when the aircraft is installed with the safety protection device, and the reference comparison image at least comprises the part of the installation occupancy area;

determine a similarity between the reference comparison image and the target image; and determine that the aircraft is installed with the safety protection device in response to the similarity being greater than or equal to a preset similarity, or determine that the aircraft is not installed with the safety protection device in response to the similarity less than the preset similarity.

7. The aircraft according to claim 5, wherein to determine whether the aircraft is installed with the safety protection device based on the target image, the at least one processor executes the at least one set of instructions to cause the aircraft to at least:

obtain a reference comparison image library, wherein the reference comparison image library comprises a plurality of reference comparison images;

determine a similarity between the target image and the plurality of reference comparison images in the reference comparison image library; and determine that the aircraft is installed with the safety protection device in response to the similarity between at least one of the plurality of reference comparison images in the reference comparison image library and the target image being greater than or equal to a preset similarity, or determine that the aircraft is not installed with the safety protection device in response to the similarity between none of the plurality of reference comparison images in the reference comparison image library and the target image being greater than or equal to the preset similarity.

8. The aircraft according to claim 5, wherein to determine whether the aircraft is installed with the safety protection device based on the target image, the at least one processor executes the at least one set of instructions to cause the aircraft to at least:

obtain a first recognition model of the safety protection device; and determine whether the aircraft is installed with the safety protection device based on the first recognition model.

9. The aircraft according to claim 8, wherein to determine whether the aircraft is installed with the safety protection device based on the first recognition model, the at least one processor executes the at least one set of instructions to-cause the aircraft to at least:

input the target image into the first recognition model for recognition processing to obtain a classification label of the target image; and determine that the aircraft is installed with the safety protection device in response to the classification label being a first classification label, or determine that the aircraft is not installed with the safety protection device in response to the classification label being a second classification label.

10. The aircraft according to claim 8, wherein the first recognition model is obtained by iteratively training a neural network model based on a first sample data set, and the first sample data set comprises a plurality of positive sample data and a plurality of negative sample data;

the plurality of positive sample data comprises a first sample image and a first classification label, and the first sample image contains the safety protection device; and the plurality of negative sample data comprises a second sample image and a second classification label, and the second sample image does not contain the safety protection device.

11. The aircraft according to claim 5, wherein prior to obtaining the target image collected by the imaging device, the at least one processor executes the at least one set of instructions to further cause the aircraft to at least:

obtain an ambient light intensity; and obtain the target image collected by the imaging device when the ambient light intensity is greater than or equal to a preset light intensity threshold.

12. The aircraft according to claim 5, wherein to obtain the target image collected by the imaging device, the at least one processor executes the at least one set of instructions to cause the aircraft to at least:

obtain an image collected by the imaging device in a preset attitude, and determine the image as the target image; wherein an image collection range of the imaging device in the preset attitude at least partially overlaps with the installation occupancy area of the safety protection device on the aircraft.

13. The aircraft according to claim 5, wherein to obtain the target image collected by the imaging device, the at least one processor executes the at least one set of instructions to cause the aircraft to at least:

obtain a plurality of images collected by the imaging device rotating within a first rotation range; and combine the plurality of images to obtain the target image, wherein when the imaging device rotates within the first rotation range, an image collection range of the imaging device at least partially overlaps with the installation occupancy area of the safety protection device on the aircraft.

14. The aircraft according to claim 5, wherein the at least one processor executes the at least one set of instructions to further cause the aircraft to at least:

after controlling the aircraft to take off, control the imaging device to rotate within a second rotation range, wherein when the imaging device rotates within the second rotation range, an image collection range of the imaging device does not overlap with the installation occupancy area of the safety protection device on the aircraft.

15. The aircraft according to claim 3, wherein the sensor comprises a radar device, and to determine whether the aircraft is installed with the safety protection device based on the environmental sensing data, the at least one processor executes the at least one set of instructions to cause the aircraft to at least:

obtain point cloud data collected by the radar device, and obtain position coordinates corresponding to an installation position of the safety protection device on the aircraft;

obtain, from the point cloud data, target point cloud data matching the position coordinates, and obtain a second recognition model of the safety protection device; and determine whether the aircraft is installed with the safety protection device based on the target point cloud data and the second recognition model.

16. The aircraft according to claim 15, wherein to determine whether the aircraft is installed with the safety protection device based on the target point cloud data and the second recognition model, the at least one processor executes the at least one set of instructions to cause the aircraft to at least:

input the target point cloud data into the second recognition model for recognition processing to obtain a classification label of the target point cloud data; and determine that the aircraft is installed with the safety protection device in response to the classification label of the target point cloud data being a preset classification label, or determine that the aircraft is not installed with the safety protection device in response to the classification label of the target point cloud data not being the preset classification label.

17. The aircraft according to claim 15, wherein the second recognition model is obtained by iteratively training a neural network model based on a second sample data set, the second sample data set comprises a plurality of sample data, and the plurality of sample data comprises sample point cloud data matching the position coordinates and annotated classification labels.

18. The aircraft according to claim 1, wherein the aircraft further comprises an installation detection device to detect the safety protection device, and the at least one processor executes the at least one set of instructions to further cause the aircraft to at least:

in response to the takeoff control instruction, obtain installation detection information output by the installation detection device; and determine that the aircraft is installed with the safety protection device in response to the installation detection information meeting a preset condition, or determine that the aircraft is not installed with the safety protection device in response to the installation detection information not meeting the preset condition.

19. An aircraft, comprising:

a body, including one or more propellers;

at least one storage medium storing at least one set of instructions for controlling the aircraft; and at least one processor in communication with the at least one storage medium and a sensor carried by the body, wherein during operation, the at least one processor executes the at least one set of instructions to cause the aircraft to at least:

receive a takeoff control instruction, in response to receiving the takeoff control instruction, control the sensor to turn toward a direction of the one or more propellers on the aircraft to detect installation of a safety protection device around the one or more propellers on the aircraft, and not determine surrounding conditions and not execute the takeoff control instruction to so as not to allow the aircraft to take off in response to the safety protection device not being installed around the one or more propellers on the aircraft; or execute the takeoff control instruction, control, after takeoff, the sensor to turn to a direction that does not face the one or more propellers on the aircraft for detection during flight, and lock the sensor in an angle range, in response to the safety protection device being installed around the one or more propellers on the aircraft.

20. A method for control an aircraft, comprising:

receiving a takeoff control instruction;

in response to receiving the takeoff control instruction, controlling a sensor carried by the aircraft to turn toward a direction of one or more propellers on the aircraft to detect installation of a safety protection device around one or more propellers on the aircraft, and not executing the takeoff control instruction in response to the safety protection device not being installed around the one or more propellers on the aircraft; or executing the takeoff control instruction, controlling, after takeoff, the sensor to turn to a direction that does not face the one or more propellers on the aircraft for detection during flight, and lock the sensor in an angle range, in response to the safety protection device being installed.

* * * * *